US006728065B2

(12) United States Patent
Batra et al.

(10) Patent No.: US 6,728,065 B2
(45) Date of Patent: Apr. 27, 2004

(54) SINGLE POLE MAGNETIC RECORDING HEAD FOR PERPENDICULAR MAGNETIC RECORDING

(75) Inventors: Sharat Batra, Wexford, PA (US); Gregory Parker, Warrendale, PA (US); Petrus Antonius Van der Heijden, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 10/098,663

(22) Filed: Mar. 15, 2002

(65) Prior Publication Data
US 2002/0141111 A1 Oct. 3, 2002

Related U.S. Application Data
(60) Provisional application No. 60/279,959, filed on Mar. 29, 2001.

(51) Int. Cl.[7] ................................................. G11B 5/31
(52) U.S. Cl. ........................................ 360/126; 360/123
(58) Field of Search ................................ 360/119, 123, 360/125, 126

(56) References Cited

U.S. PATENT DOCUMENTS

| 5,627,804 | A | * | 5/1997 | Ishii ......................... 369/13.17 |
| 5,942,342 | A | * | 8/1999 | Hikosaka et al. ........ 428/694 R |
| 5,978,186 | A | * | 11/1999 | Murata et al. ............... 360/123 |
| 5,991,126 | A | * | 11/1999 | Hayashi et al. ............. 360/125 |
| 6,072,669 | A | * | 6/2000 | Indeck ......................... 360/121 |
| 6,229,673 | B1 | * | 5/2001 | Shinohara et al. ........ 360/246.2 |
| 6,292,329 | B1 | * | 9/2001 | Sato et al. .................... 360/126 |
| 6,513,228 | B1 | * | 2/2003 | Khizroev et al. ......... 29/603.14 |

FOREIGN PATENT DOCUMENTS

| JP | 6-309625 A | * | 11/1994 |
| JP | 9-147319 A | * | 6/1997 |
| JP | 2002-100005 A | * | 4/2002 |
| JP | 2002-197615 A | * | 7/2002 |
| JP | 2003-16609 A | * | 1/2003 |

* cited by examiner

Primary Examiner—Jefferson Evans
(74) Attorney, Agent, or Firm—Buchanan Ingersoll, P.C.

(57) ABSTRACT

A single pole magnetic recording head is provided according to the present invention for perpendicular magnetic recording on a recording medium. The magnetic recording head includes a main magnetic pole having a first end positionable adjacent the recording medium and a second end spaced from the first end. A coil is magnetically coupled to the main magnetic pole for producing a write flux. The magnetic recording head further includes a magnetic return pole forming first and second return paths for the magnetic flux. The magnetic return pole includes first and second return poles disposed on opposite sides of, and spaced from, the main magnetic pole, and a magnetic via connecting the first and second poles and extending over the main magnetic pole forming a back shield. The main magnetic pole is isolated from the magnetic return pole by a control gap of nonmagnetic material between the second end of the main magnetic pole and the magnetic via to effectively isolate the main magnetic pole from the magnetic return pole.

26 Claims, 6 Drawing Sheets

SINGLE POLE MAGNETIC RECORDING HEAD FOR PERPENDICULAR MAGNETIC RECORDING

CROSS-REFERENCE TO RELATED APPLICATIONS

This application claims the benefit of co-pending provisional Patent Application Serial No. 60/279,959 entitled "A Perpendicular Recording Head To Minimize Write Asymmetry", filed on Mar. 29, 2001, the entire disclosure of which is incorporated by reference herein.

FIELD OF THE INVENTION

The present invention is directed toward magnetic recording heads and, more particularly, toward magnetic recording heads designed to minimize write asymmetry.

BACKGROUND OF THE INVENTION

The ability to increase the storage capacity in magnetic recording is an ongoing concern. As the amount of information to be stored continues to increase, demands for high density recording also continue to increase. In conventional longitudinal magnetic recording systems, as areal densities approach 100 Gbit/in$^2$ it has become increasingly difficult to meet the requirements of thermal stability (the degradation of written information due to thermal fluctuations), SNR (Signal-To-Noise Ratio) and writeability. Improving on one of the requirements typically results in a tradeoff negatively effecting another requirement. For example, while the SNR can be increased by reducing the grain size of the recording medium, which is normally 200 Å thick, reducing the grain size of the media results in a decrease in thermal stability. While the thermal stability can be increased by increasing the anisotropy of the recording medium, e.g., using a different alloy, this results in a decrease in writeability. While reducing the Bit Aspect Ratio (BAR) has been proposed to extend longitudinal recording up to 100 Gbit/in$^2$, the above-identified problems remain as fundamental limitations inherent in conventional longitudinal magnetic recording systems.

As the longitudinal magnetic recording technology reaches its limit in areal density due to thermal stability, SNR and writeability requirements, perpendicular magnetic recording systems (in which the recording medium is magnetized in a direction perpendicular to the plane of the recording medium) have been proposed to possess the potential for higher recording densities. Various modeling and simulations have suggested that perpendicular recording is superior to conventional longitudinal recording due to various reasons, including, but not limited to, larger optimal medium thickness, better write field efficiency, and less demagnetizing fields from the stored bit patterns. Perpendicular recording, coupled with the use of a soft under-layer media, is considered a strong candidate to extend recording densities by achieving sharp transitions, even with the use of a thicker magnetic recording layer. With the soft under-layer media, stronger recording fields can be generated, which in turn allow the use of higher anisotropy media. The higher anisotropy media, coupled with the thicker magnetic recording layer, is projected to provide a gain of a factor of 5–10 in recording densities for the same thermal stability criterion.

FIG. 2 illustrates a typical example of a conventional perpendicular magnetic recording head, shown generally at 10. The magnetic recording head 10 has a single (main pole) pole for generating field at the media 11, and is conventionally known as a single pole magnetic head. The magnetic recording head 10 includes a main pole 12, a return pole 14 and a magnetic via 15 connecting the main 12 and return 14 poles. An electrically conductive magnetizing coil 16 surrounds the magnetic via 15. The recording media 11 typically includes a substrate 18, a soft magnetic underlayer 20 formed on the substrate 18, and a perpendicularly magnetized recording layer 22 formed on the soft underlayer 20.

When writing, the magnetic recording head 10 is separated from the recording media 11 by a distance known as the "fly height". The recording media 11 is moved past the magnetic recording head 10 so that the recording head 10 follows the tracks of the recording media 11. The coil 16 is transversed by a current and produces a magnetic flux 24 channeled by the main pole 12 to produce an intense writing flux at the tip 26 of the main pole 12 which records the information in the magnetic recording layer 22. The flux 24 passes from the tip 26 of the main pole 12, through the magnetic recording layer 22, into the soft underlayer 20, and across to the return pole 14, which provides a return path for the flux, thereby forming a closed magnetic circuit in which the magnetic flux in the recording layer 22 directly under the poles of the magnetic recording head 10 is oriented perpendicular to the plane of the recording layer 22. The cross-sectional area of the return pole 14 is larger than that of the main pole 12 to ensure that the flux density at the return pole 14 is sufficiently reduced as not to magnetize the recording layer 22.

While perpendicular recording has its advantages over longitudinal recording, the use of the soft underlayer 20 poses some challenges during writing as well as reading. Because of the relatively high permeability of the soft underlayer, transitions previously recorded on adjacent tracks can influence the transitions being written at the main pole 12. Depending on the magnetization state of the tracks adjacent to the written track, an asymmetry is introduced in the written di-bit response. This is typically referred to as the "neighborhood effect".

FIG. 1 shows two written di-bits, at 26 and 28, separated by an isolated transition, at 30, using a conventional single pole perpendicular recording head on a recording media with a soft underlayer. Three different states of magnetization of the neighboring track are illustrated in FIG. 1, namely, AC erase (neighboring track not magnetized), DC erase (+) (neighboring track magnetized upward) and DC erase (−) (neighboring track magnetized downward). As shown in FIG. 1, depending on the magnetization state of the neighboring track, i.e, DC erase (+) or DC erase (−), an asymmetry is seen in the corresponding di-bit pattern. This asymmetry is illustrated in both a change in amplitude of the measured flux and a time shift in the written di-bit pattern. The time shift asymmetry in the di-bit pattern and the amplitude asymmetry in the amplitude of the di-bits shows as a measurable time shift for an isolated transition. Since the magnetization pattern from the neighboring tracks changes depending on the data stored on the neighboring tracks, this will change the di-bit asymmetry. This asymmetry will effect the performance of linear channels and degrade the areal density that can be achieved by those linear channels. Further, the effects of the di-bit pattern asymmetry become even more evident at smaller track widths, i.e., higher areal densities.

Additionally, stray magnetic fields from the other components in the disc drive also can corrupt the recorded information. These stray magnetic fields couple with the main pole 12 of the recording head 10 and either add to or subtract from the write field, producing further written asymmetry and transition shifts.

The present invention is directed toward overcoming one or more of the above-mentioned problems.

SUMMARY OF THE INVENTION

A single pole magnetic recording head is provided according to the present invention for perpendicular magnetic recording on a recording medium. The magnetic recording head includes a main magnetic pole having a first end positionable adjacent the recording medium and a second end spaced from the first end. A coil is magnetically coupled to the main magnetic pole for producing a write flux. The magnetic recording head further includes a magnetic return pole forming first and second return paths for the magnetic flux. The magnetic return pole includes first and second return poles disposed on opposite sides of, and spaced from, the main magnetic pole, and a magnetic via connecting the first and second return poles and extending over the main magnetic pole forming a back shield. The main magnetic pole is isolated from the magnetic return pole by a control gap of non-magnetic material between the second end of the main magnetic pole and the magnetic via to effectively isolate the main magnetic pole from the magnetic return pole.

In one form, the magnetic return pole is formed of a magnetic material having a first saturation magnetization and anisotropy, with the main magnetic pole formed of a magnetic material having a second saturation magnetization and anisotropy which may be greater than the first saturation magnetization and anisotropy.

In another form, the coil surrounds the main magnetic pole. The first and second return poles include first and second ends, respectively, positionable adjacent to the recording medium. The first and second return poles may include first and second front shields, respectively, adjacent the first and second ends, respectively. The first and second front shields are made of the same material as the magnetic return pole and extend toward the main magnetic pole such that the first and second front shields are disposed between the coil and the recording medium.

In yet another form, the coil includes first and second coils surrounding the magnetic via on opposite sides of the main magnetic pole.

In still another form, the magnetic return pole includes first and second symmetrical magnetic return poles forming symmetrical magnetic return paths for the magnetic flux. The symmetrical first and second return poles are positioned one upstream and one downstream of the main magnetic pole relative to the direction of movement of the recording medium.

In a further form, the main magnetic pole first end and the first and second ends of the first and second return poles lie in the same plane, such that with the magnetic recording head utilized for perpendicular magnetic recording the first end of the main magnetic pole and the first and second ends of the first and second return poles, respectively, are the same distance from the recording medium.

The field under the first and second return poles must be small as to not corrupt neighboring tracks and, therefore, the cross-sectional areas of the first and second return poles must be larger than the cross-sectional area of the main magnetic pole.

A magnetic recording head is also provided according to an additional embodiment of the present invention for magnetic recording on recording medium. The magnetic recording head includes a main magnetic pole having a first end positionable adjacent to the recording medium and a second end spaced from the first end. A coil is provided which is magnetically coupled to the main magnetic pole to produce a write flux. The magnetic recording head includes a magnetic return pole forming first and second return paths for the magnetic flux. The magnetic return pole includes first and second return poles disposed on opposite side of, and spaced from, the main magnetic pole, and a back shield connecting the first and second return poles. The back shield includes first and second magnetic vias extending from the first and second return poles, respectively, and a non-magnetic portion connecting the first and second magnetic vias. The second end of the main magnetic pole is disposed in the non-magnetic portion, such that the nonmagnetic portion surrounds the second end of the main magnetic pole. The main magnetic pole is separated from the magnetic return pole by a control gap of the non-magnetic portion material between the second end of the main magnetic pole and the first and second magnetic vias to effectively isolate the main magnetic pole from the magnetic return pole.

It is an aspect of the present invention to minimize write asymmetry in perpendicular magnetic recording.

It is further aspect of the present invention to reduce the effects of external stray magnetic fields in perpendicular magnetic recording.

Other aspects and advantages of the present invention can be obtained from the study of the specification, the drawings, and the appended claims.

DETAILED DESCRIPTION OF THE INVENTION

Figure 1:
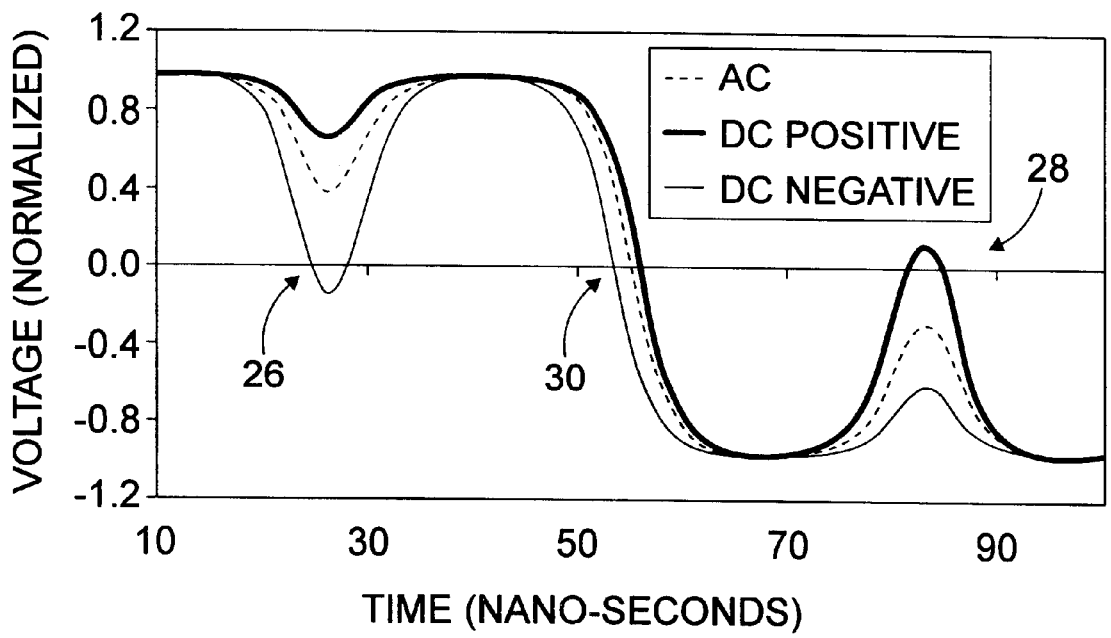
FIG. 1 is a graph illustrating the asymmetry in corresponding di-bit patterns produced by the so-called "neighborhood effect"
Figure 2:
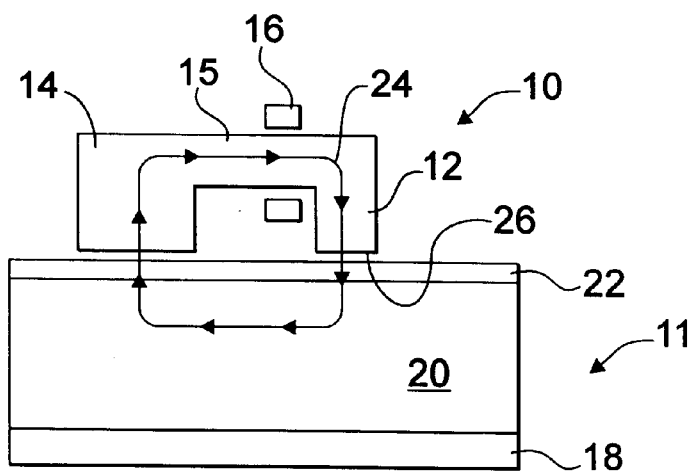
FIG. 2 is a partial side view of a prior art perpendicular magnetic recording head.
Figure 3:
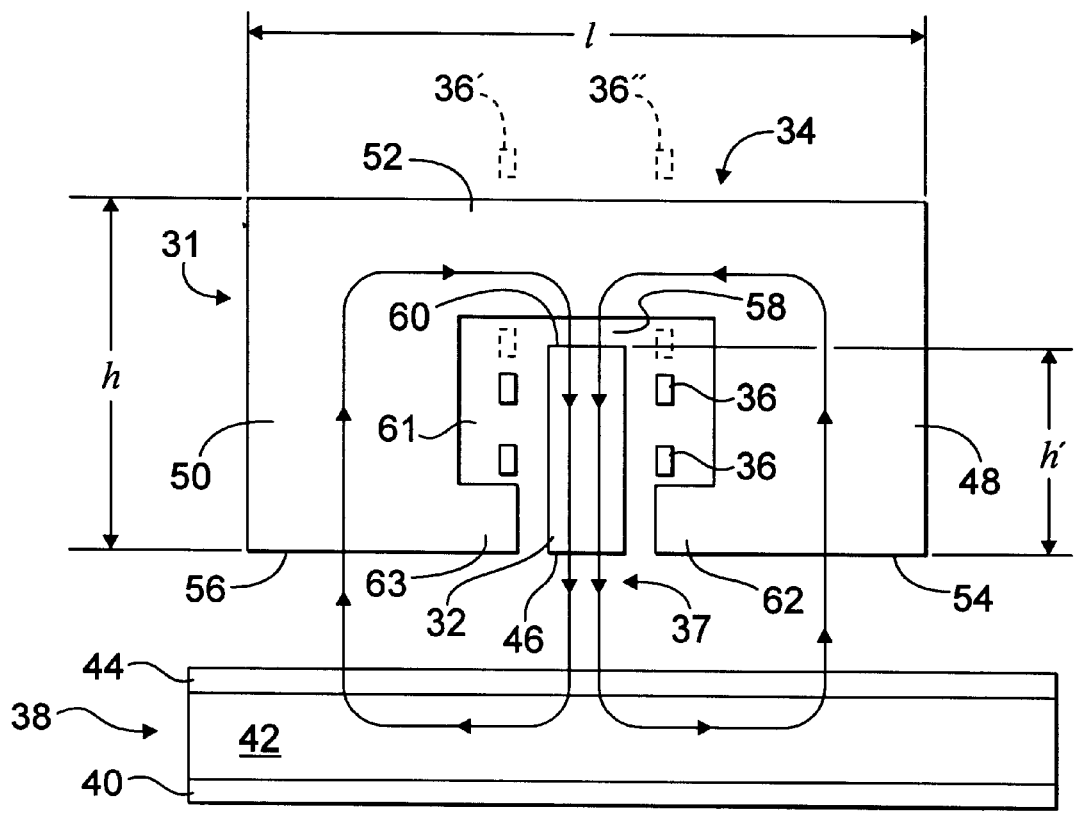
FIG. 3 is a partial side view of a first embodiment of the perpendicular magnetic recording head according to the present invention.
Figure 4:
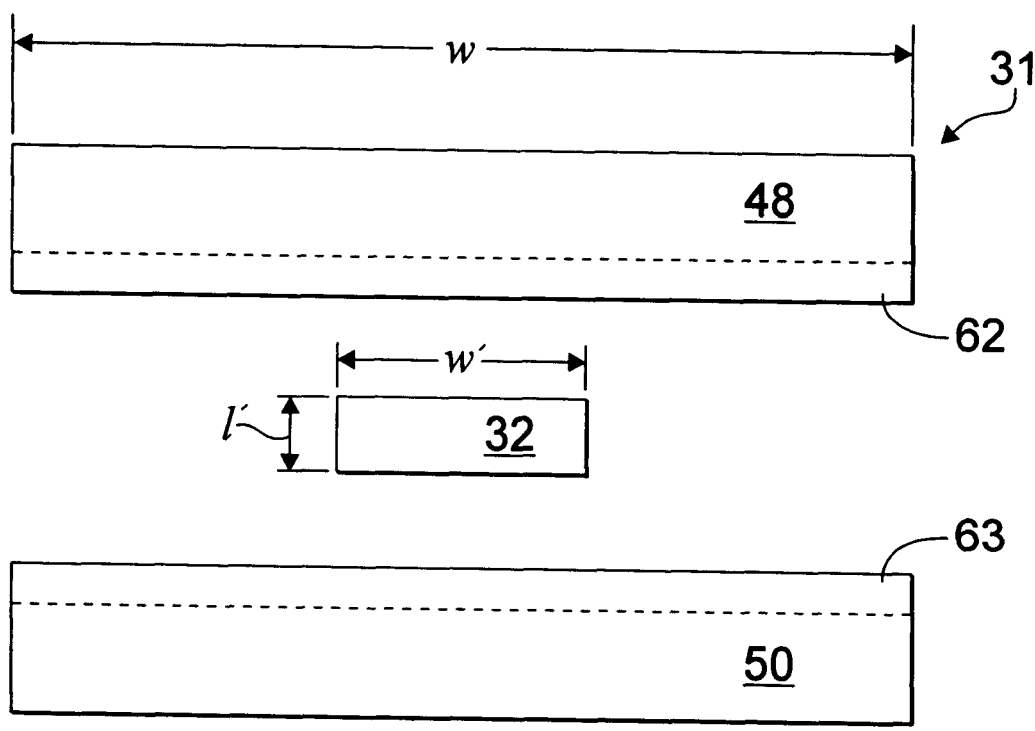
FIG. 4 is an air bearing surface view of the perpendicular magnetic recording head shown in FIG. 3.
Figure 5:
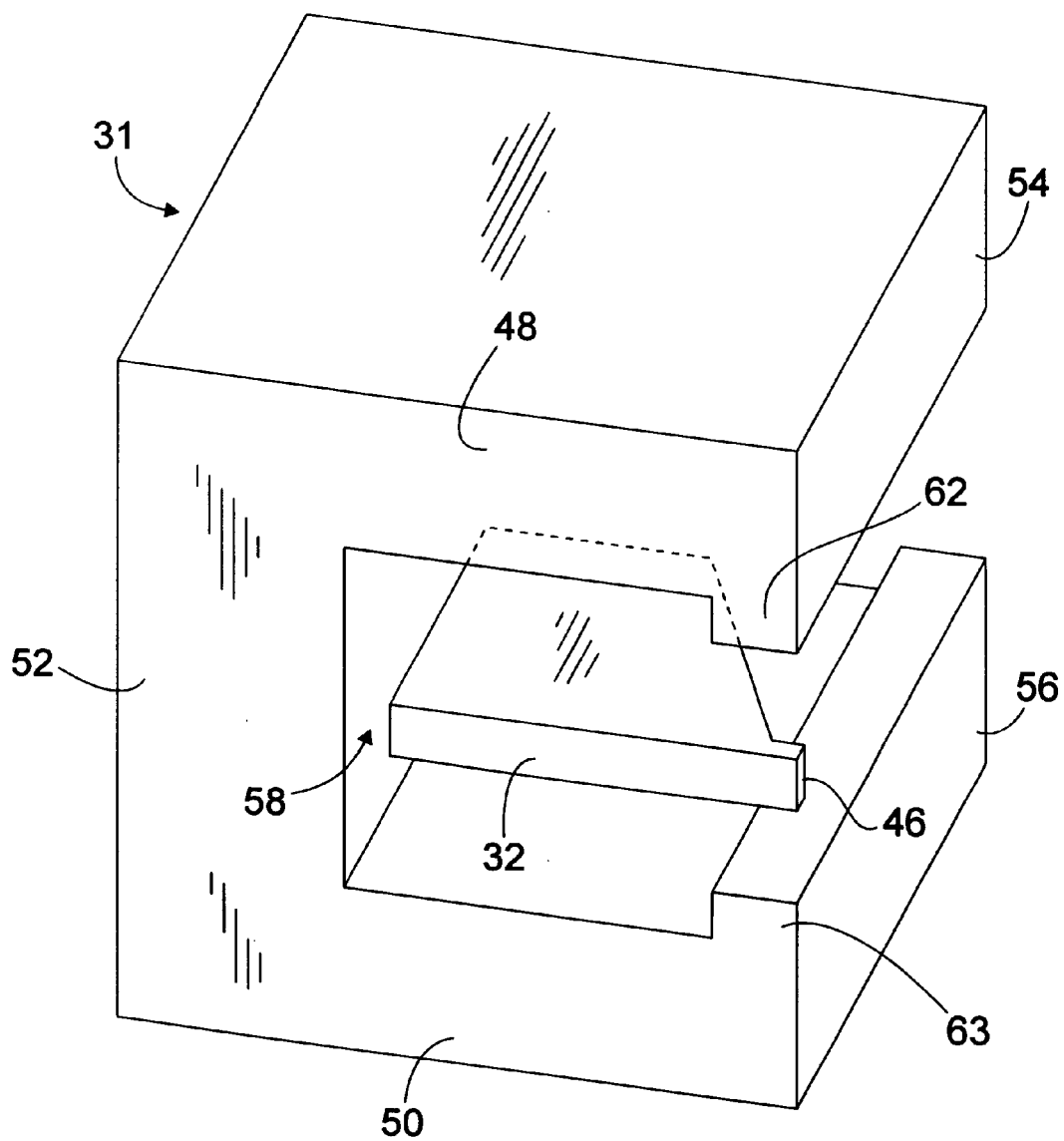
FIG. 5 is a partial isometric view of the perpendicular magnetic recording head shown in FIGS. 3 and 4.

FIGS. 3–5 illustrate a perpendicular magnetic recording head, shown generally at 31, according to the present invention. The magnetic recording head 31 includes a main magnetic pole 32 and a magnetic return pole 34. An electrically conductive magnetizing coil 36 is provided about the main pole 32 and is magnetically coupled to the main pole 32 to generate a write flux 37. Typically, the recording head 31 is positioned above the recording media 38 for reading and writing, with the separation distance commonly known as the "fly height". A typical fly height separation distance ranges from about 5 nm to about 60 nm.

The recording media 38 includes a substrate 40, a soft magnetic underlayer 42 formed on the substrate 40, and a perpendicularly magnetized recording layer 44 formed on the soft underlayer 42. An intense flux 37 is produced at a first end 46 of the main pole 32 which perpendicularly magnetizes the recording layer 44 to record information. Typically, the magnetic recording head 31 is dimensioned to have a length "l" ranging from about 1 micron to about 8 microns, and a width "w" ranging from about 1 micron to about 50 microns. Typically, the main pole 32 is dimensioned to have a length "l" ranging from about 0.1 microns to about 1 micron, a width "w" ranging from about 20 nm to about 1 micron, and a height "h" ranging from about 1 micron to about 10 microns. As will be appreciated by one skilled in the art, the height "h" of the recording head 31 will vary depending on the height "h" of the main pole 32. However, these dimensions are in no way meant to be limiting, and other recording head dimensions may be utilized without departing from the spirit and scope of the present invention.

The magnetic return pole 34 includes first 48 and second 50 return poles disposed on opposite sides of, and spaced from, the main magnetic pole 32. The first 48 and second 50 return poles are each spaced from the main magnetic pole 32 a distance from about 50 nm to about 1000 nm. A magnetic via 52 connects the first 48 and second 50 return poles and extends over the main magnetic pole 32 to form a back shield. The flux 37 generated at the first end 46 of the main magnetic pole 32 flows through the recording layer 44, into the soft underlayer 42, and across to the first 48 and second 50 return poles, thus forming first and second return paths for the magnetic flux. The first 48 and second 50 return poles are positioned such that one is upstream of the main pole 32 and one is downstream of the main pole 32 relative to the direction of movement of the recording medium 38.

The first 48 and second 50 return poles include first 54 and second 56 return ends, respectively, which are positionable adjacent the recording medium 38. The first 54 and second 56 return ends are each larger in surface area than the surface area of the first end 46 of the main pole 32 at the air bearing surface to ensure that the flux density at the return poles 48 and 50 is insufficient to magnetize the recording layer 44. For the same reason, the cross-sectional areas of the first 48 and second 50 return poles are also each larger than the cross-sectional area of the main magnetic pole 32. As shown in FIG. 3, the first 54 and second 56 return ends lie in the same plane as the first end 46 of the main pole 32, such that each of the ends are the same distance from the recording medium 38 when in use.

To isolate the main pole 32 from the return pole 34 and thus reduce the effects of magnetic fields from the transitions on neighboring tracks, the main magnetic pole 32 is separated by a control gap 58 of non-magnetic material between a second end 60, spaced from the first end 46, of the main magnetic pole 32 and the magnetic via 52. The control gap 58 of non-magnetic material may be varied to reduce the coupling of the magnetic fields from the transitions on neighboring tracks to the main pole 32. The control gap 58 will, however, reduce the efficiency of the magnetic recording head 30, thereby requiring the use of a higher write current. However, this is a relatively minor tradeoff.

In addition, the structure of the return pole 34, which forms an umbrella-like shield over the main magnetic pole 32, reduces the effects of stray magnetic fields on the main magnetic pole 32. These stray magnetic fields may result from devices external to the recording head, such as motors, magnets, or other components of the disc drive.

The coil 36 is shown in FIG. 3 as surrounding the main pole 32. However, the coil 36 may include first and second coils (not shown) surrounding the magnetic via 52 on opposite sides of the main pole 32, without departing from the spirit and scope of the present invention.

A photoresist or oxide insulator ($Al_2O_3$) fills the cavity 61 defined by the magnetic return pole 34 and holds the main magnetic pole 32 and coils 36 in place. This non-magnetic material also fills the control gap 58 isolating the main pole 32 from the return pole 34.

Typically, both the main pole 32 and return pole 34 will be formed of a material having a high saturation magnetization and anisotropy. These materials include, but are not limited to, alloys of iron, cobalt, nickel or boron, which exhibit sufficient magnetization and permeability properties. For example, the return pole 34 may be made of a permalloy, while the main pole 32 is typically formed of a higher moment material having a higher saturation magnetization and anisotropy than the return pole 34, which increases writeability. The writeability of the recording head 31 is also increased due to the use of the soft underlayer 42, which essentially "draws" the flux 37 from the main pole 32. To further increase writeability and reduce write asymmetry, the magnetic return pole 34 is formed such that it is symmetrical about the main pole 32, thus forming symmetrical flux return paths for the magnetic flux 37 generated at the first end 46 of the main pole 32.

The first 48 and second 50 return poles also may include first 62 and second 63 front shields formed adjacent the first 54 and second 56 ends, respectively. The first 62 and second 63 front shields are formed of the same material as the return pole 34 and extend toward the main magnetic pole 32 such that they are disposed between the coil 36 and the recording media 38 thereby shielding the coil 36 from the field generated at the recording layer 44.

Figure 7:
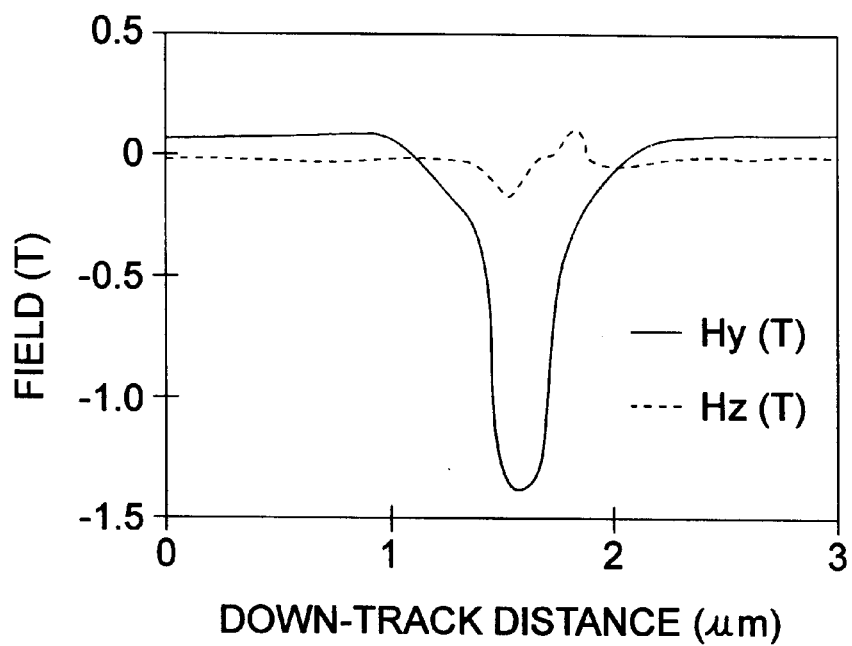
FIG. 7 is a graph of the down-track field profile for the perpendicular magnetic recording head shown in FIG. 3.
Figure 8:
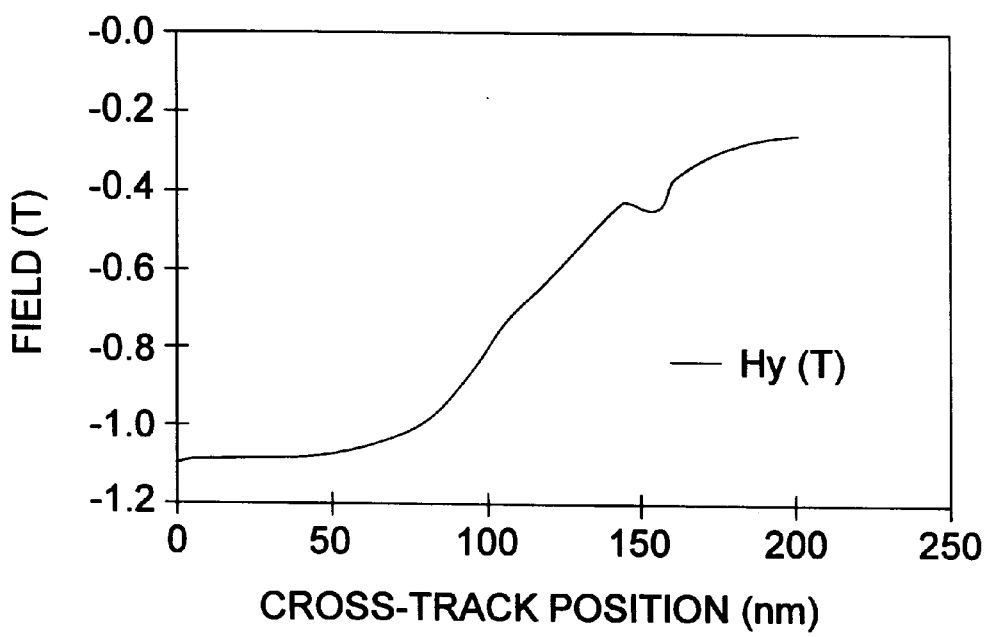
FIG. 8 is a graph of the cross-track field profile for the perpendicular magnetic recording head shown in FIG. 3.

FIGS. 7 and 8 are graphs of the down-track distance and cross-track position for the magnetic recording head 31. As illustrated in FIG. 7, large magnetic fields are generated under the main pole 32 without the magnetic fields under the return poles 48 and 50 erasing or corrupting data on adjacent tracks. The magnetic fields under the return poles 48 and 50 is substantially reduced without affecting writeability of the main pole 32. As illustrated in FIG. 8, the cross-track performance of the recording head 31 is not degraded by the addition of the nonmagnetic gap 58.

Figure 6:
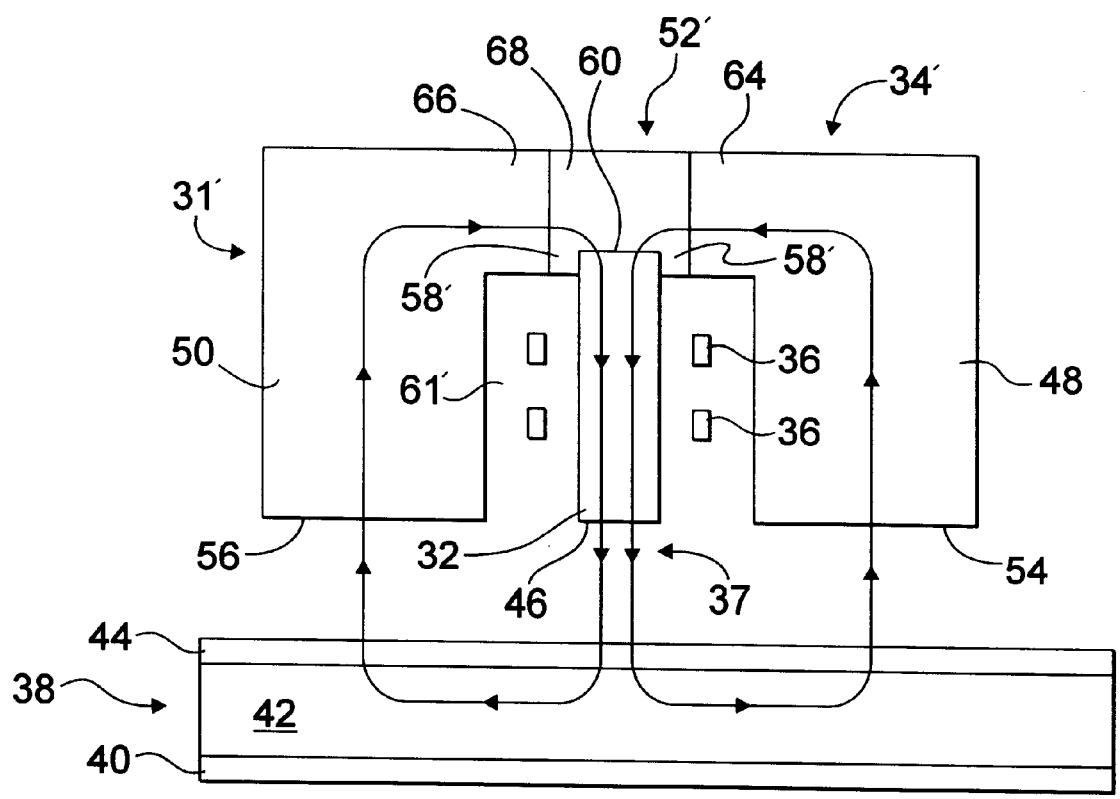
FIG. 6 is a partial side view of a second embodiment of the perpendicular magnetic recording head according to the present invention.

FIG. 6 illustrates an alternate embodiment of the magnetic recording head, shown generally at 31', with like elements of FIG. 3 indicated with the same reference number and those elements requiring modification indicated with a prime ('). For simplicity, the first 62 and second 63 front shields in FIG. 3 have been left out of FIG. 6.

The magnetic recording head 31' operates according to the same principles as the magnetic recording head 31 described in FIG. 3. The main modification to the magnetic recording head 31' is that the magnetic via 52 now includes a back shield 52' divided into magnetic and non-magnetic materials. The back shield 52 includes first 64 and second 66 magnetic vias extending from the first 48 and second 50 return poles, respectively. A non-magnetic portion 68 connects the first 64 and second 66 magnetic vias. The second end 60 of the main magnetic pole 32 is disposed in the non-magnetic portion 68. The main magnetic pole 32 is thus isolated from the magnetic return pole 34' by a control gap 58' of non-magnetic material formed by the non-magnetic portion 68. The non-magnetic portion 68 may be formed the same non-magnetic material filling the cavity 61' of the return pole 34', or may be of another type of non-magnetic material. The control gap 58, 58' of non-magnetic material separating the main magnetic pole 32 from the return magnetic pole 34, 34' may be varied according to desired operating characteristics.

Additionally, while the coil 36 is show in FIG. 6 as surrounding the main pole 32, the coil 36 may include first and second coils (not shown) surrounding the first 64 and second 66 magnetic vias, respectively, without departing from the spirit and scope of the present invention.

The magnetic recording head 31 of FIG. 3 may be processed through conventional head processing techniques. The first return pole 48 is sputter or electroplate deposited. This is followed by a deposition of the first front shield 62 and a portion of the magnetic via 52. A self-aligned coil is used to form the electrically conductive magnetizing coil 36, followed by deposition of a non-magnetic material ($Al_2O_3$) and a chemical mechanical planarization (CMP) process. An additional gap layer of non-magnetic material is deposited, followed by the main write pole 32. A second gap layer of non-magnetic material is deposited, followed by a second coil layer which is connected to the first coil layer by conventionally opening and plating into a coil via to form the coil 36. The second front shield 63 and a non-magnetic layer is then deposited. The second return pole 50 is deposited and a via is opened to connect the first 48 and second 50 return poles, thus forming the magnetic via 52.

The magnetic recording head 31' of FIG. 6 can also be processed through conventional head processing techniques. The first return pole 48 is sputter or electroplate deposited. This step is followed by a deposition of the first magnetic via 64 and a non-magnetic material. A self-aligned coil is used to form the electrically conductive magnetizing coil 36, followed by deposition of a non-magnetic layer ($Al_2O_3$) and a CMP process is utilized to planarize the structure. Subsequently, a non-magnetic gap layer is deposited, followed by the main pole 32 deposition and a CMP planarization process for the main pole to control its thickness. After the main pole 32 is deposited, a second non-magnetic gap layer is deposited, followed by a second coil which is connected to the first coil layer by conventionally opening and plating into a coil via to form the coil 36. A non-magnetic layer is then deposited. Finally, the second return pole 50 is deposited and a via is opened to form the second magnetic via 66 and connect the second return pole 50 to the non-magnetic portion 68.

While the present invention has been described with particular reference to the drawings, it should be understood that various modifications could be made without departing from the spirit and scope of the present invention.

We claim:

1. A single pole magnetic recording head for perpendicular magnetic recording on a recording medium comprising:
   a main magnetic pole having a first end positionable adjacent the recording medium;
   a coil magnetically coupled to the main magnetic pole; and
   a magnetic return pole forming first and second return paths for a magnetic flux, the magnetic return pole substantially surrounding the main magnetic pole except at the first end of the main magnetic pole,
   wherein the main magnetic pole is isolated from the magnetic return pole by a control gap of non-magnetic material between the main magnetic pole and the magnetic return pole.

2. The magnetic recording head of claim 1, wherein the first end of the main magnetic pole lies in a first plane, and wherein the magnetic return pole includes first and second return ends which also lie in the first plane, such that with the magnetic recording head utilized for perpendicular magnetic recording the first end of the main magnetic pole and the first and second return ends of the magnetic return pole are the same distance from the recording medium.

3. The magnetic recording head of claim 2, wherein the magnetic return pole includes first and second front shields adjacent the first and second return ends, respectively, the first and second front shields extend from the first and second return ends, respectively, toward the main magnetic pole such that the first and second front shields are disposed between the coil and the recording medium.

4. The magnetic recording head of claim 1, wherein the coil surrounds the main magnetic pole.

5. A single pole magnetic recording head for perpendicular magnetic recording on a recording medium comprising:
   a main magnetic pole having a first end positionable adjacent the recording medium:
   a coil magnetically coupled to the main magnetic pole; and
   a magnetic return pole forming first and second return paths for a magnetic flux, the magnetic return pole substantially surrounding the main magnetic pole except at the first end of the main magnetic pole,
   wherein the main magnetic pole is isolated from the magnetic return pole by a control gap of non-magnetic material between the main magnetic pole and the magnetic return pole, and
   wherein the magnetic return pole comprises:
      first and second return poles disposed on opposite sides of the main magnetic pole; and
      a magnetic via connecting the first and second return poles and extending over the main magnetic pole,
      wherein the control gap of non-magnetic material isolating the main magnetic pole from the magnetic return pole is formed between the main magnetic pole and the magnetic via.

6. The magnetic recording head of claim 5, wherein the main magnetic pole and the first and second return poles include cross-sectional areas taken along a plane parallel to the first plane, and wherein the cross-sectional areas of the first and second return poles are greater than the cross-sectional area of the main magnetic pole.

7. The magnetic recording head of claim 5, wherein the coil comprises first and second coils surrounding the magnetic via on opposite sides of the main magnetic pole.

8. The magnetic recording head of claim 5, wherein the first and second return poles are positioned one upstream and one downstream of the main magnetic pole relative to the direction of movement of the recording medium.

9. A single pole magnetic recording head for perpendicular magnetic recording on a recording medium comprising:
   a main magnetic pole having a first end positionable adjacent the recording medium and a second end spaced from the first end;
   a coil magnetically coupled to the main magnetic pole; and
   a magnetic return pole forming first and second return paths for a magnetic flux, the magnetic return pole comprising:
      first and second return poles disposed on opposite sides of, and spaced from, the main magnetic pole; and
      a magnetic via connecting the first and second return poles and extending over the main magnetic pole,
   wherein the main magnetic pole is isolated from the magnetic return pole by a control gap of non-magnetic material between the second end of the main magnetic pole and the magnetic via.

10. The magnetic recording head of claim 9, wherein the magnetic return pole is formed of a magnetic material having a first saturation magnetization and anisotropy, and wherein the main magnetic pole is formed of a magnetic material having a second saturation magnetization and anisotropy greater than the first saturation magnetization and anisotropy.

11. The magnetic recording head of claim 9, wherein the coil surrounds the main magnetic pole.

12. The magnetic recording head of claim 11, wherein the first and second return poles include first and second return ends, respectively, positionable adjacent the recording medium, and wherein the first and second return poles include first and second front shields, respectively, adjacent the first and second return ends, respectively, the first and second front shields extending toward the main magnetic pole such that the first and second front shields are disposed between the coil and the recording medium.

13. The magnetic recording head of claim 9, wherein the coil comprises first and second coils surrounding the magnetic via on opposite sides of the main magnetic pole.

14. The magnetic recording head of claim 9, wherein the magnetic return pole comprises symmetrical magnetic return poles forming symmetrical magnetic return paths for the magnetic flux.

15. The magnetic recording head of claim 9, wherein the first and second return poles are positioned one upstream and one downstream of the main magnetic pole relative to the direction of movement of the recording medium.

16. The magnetic recording head of claim 9, wherein the first and second return poles include first and second return ends, respectively, positionable adjacent the recording medium, and wherein the main magnetic pole first end and the first and second return ends lie in the same plane, such that with the magnetic recording head utilized for perpendicular magnetic recording the first end and first and second return ends are the same distance from the recording medium.

17. The magnetic recording head of claim 9, wherein the main magnetic pole has a cross-sectional area less than a cross-sectional area of the first and second return poles.

18. A single pole magnetic recording head for perpendicular magnetic recording on a recording medium comprising:
   a main magnetic pole having a first end positionable adjacent the recording medium and a second end spaced from the first end;
   a coil magnetically coupled to the main magnetic pole; and
   a magnetic return pole forming first and second return paths for a magnetic flux, the magnetic return pole comprising:
      first and second return poles disposed on opposite sides of, and spaced from, the main magnetic pole; and
      a back shield connecting the first and second return poles, the back shield comprising:
         first and second magnetic vias extending from the first and second return poles, respectively; and
         a non-magnetic portion connecting the first and second magnetic vias,
   wherein the second end of the main magnetic pole is disposed in the non-magnetic portion, such that the non-magnetic portion surrounds the main magnetic pole second end, and wherein the main magnetic pole is isolated from the magnetic return pole by a control gap of the non-magnetic portion material between the second end of the main magnetic pole and the first and second magnetic vias.

19. The magnetic recording head of claim 18, wherein the coil surrounds the main magnetic pole.

20. The magnetic recording head of claim 19, wherein the first and second return poles include first and second return ends, respectively, positionable adjacent the recording medium, and wherein the first and second return poles include first and second front shields, respectively, adjacent the first and second return ends, respectively, the first and second front shields extending toward the main magnetic pole such that the first and second front shields are disposed between the coil and the recording medium.

21. The magnetic recording head of claim 18, wherein the first and second return poles are positioned one upstream and one downstream of the main magnetic pole relative to the direction of movement of the recording medium.

22. The magnetic recording head of claim 18, wherein the first and second return poles include first and second return ends, respectively, positionable adjacent the recording medium, and wherein the main magnetic pole first end and the first and second return ends lie in the same plane, such that with the magnetic recording head utilized for perpendicular magnetic recording the first end and first and second return ends are the same distance from the recording medium.

23. The magnetic recording head of claim 18, wherein the main magnetic pole has a cross-sectional area less than a cross-sectional area of the first and second return poles.

24. The magnetic recording head of claim 18, wherein the first and second return poles and the first and second magnetic vias are formed of a magnetic material having a first saturation magnetization and anisotropy, and wherein the main magnetic pole is formed of a magnetic material having a second saturation magnetization and anisotropy greater than the first saturation magnetization and anisotropy.

25. The magnetic recording head of claim 18, wherein the coil comprises first and second coils surrounding the first and second magnetic vias, respectively.

26. The magnetic recording head of claim 18, wherein the magnetic return pole comprises symmetrical magnetic return poles forming symmetrical magnetic return paths for the magnetic flux.

* * * * *